Jan. 3, 1961 K. W. FERGUSON 2,967,297
PLANTER LIGHT
Filed April 24, 1959 2 Sheets-Sheet 1

INVENTOR.
KENNETH W. FERGUSON,
BY
McMorrow, Berman & Davidson
ATTORNEYS.

Jan. 3, 1961 K. W. FERGUSON 2,967,297
PLANTER LIGHT
Filed April 24, 1959 2 Sheets-Sheet 2

INVENTOR.
KENNETH W. FERGUSON,
BY
McMorrow, Berman & Davidson
ATTORNEYS.

United States Patent Office 2,967,297
Patented Jan. 3, 1961

2,967,297

PLANTER LIGHT

Kenneth W. Ferguson, Rte. 1, Amherst, Tex.

Filed Apr. 24, 1959, Ser. No. 808,802

3 Claims. (Cl. 340—239)

This invention relates to electrical signalling devices, and more particularly to a signal device to indicate the condition of operation of a seed planter.

A main object of the invention is to provide a novel and improved signal device to indicate the condition of operation of a seed planter, the signal device involving relatively simple components, being easy to install, and being reliable in operation.

A further object of the invention is to provide an improved electrical signal device for use on a seed planter to indicate whether or not seed is passing through the discharge spout of the planter, the signal device involving inexpensive components, being durable in construction, and providing an unmistakable indication as to the passage of seed through the discharge spout of the planter.

Further objects and advantages of the invention will become apparent from the following description and claims, and from the accompanying drawings, in which:

Figure 8 is a schematic wiring diagram showing the electrical connections of the various elements of the indicating apparatus employed in Figure 1.

Figure 1:
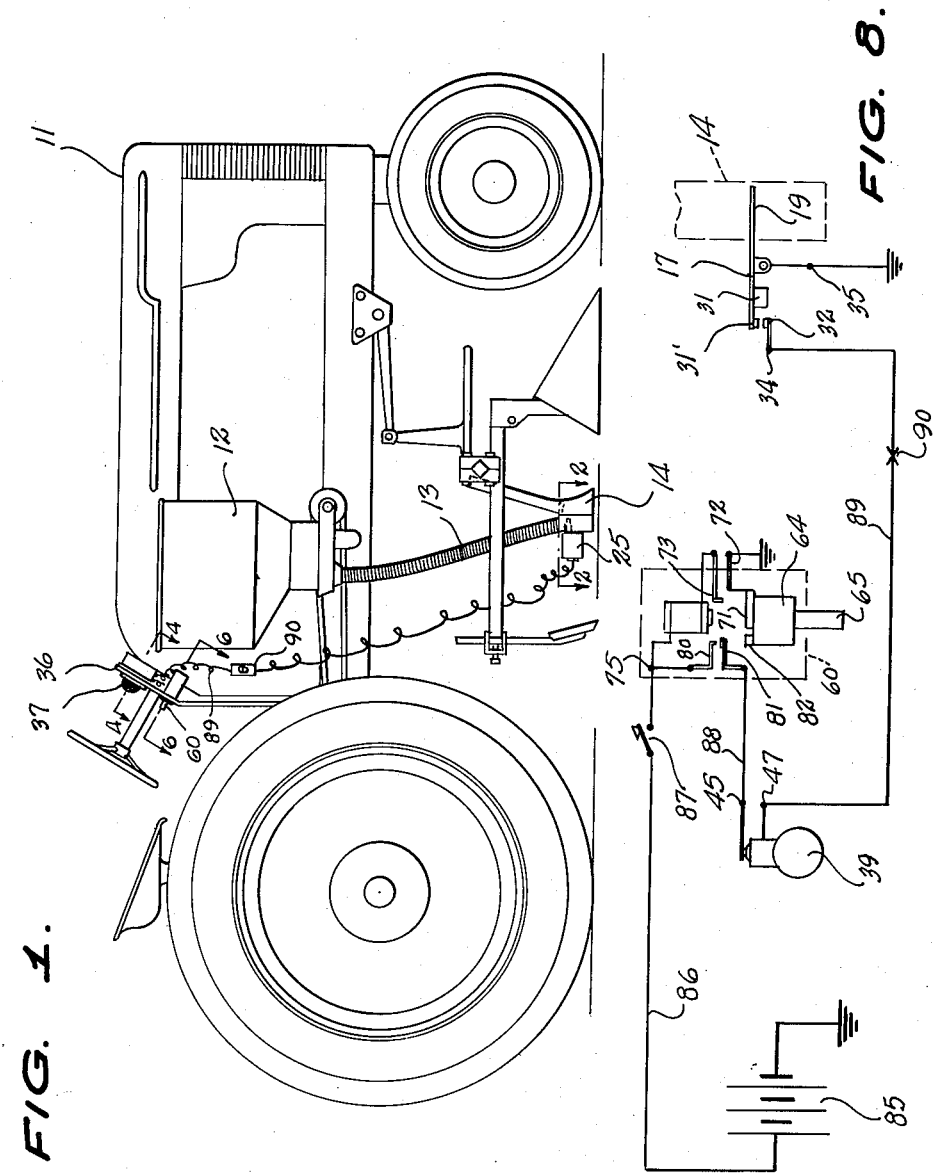
Figure 1 is a side elevational view of a tractor having a seed planter mounted thereon and provided with an improved electrical indicating apparatus according to the present invention.

Referring to the drawings, 11 designates a farm tractor on which is mounted a conventional seed planter comprising a hopper 12 provided with a depending flexible seed discharge tube 13 terminating in the discharge nozzle 14 disposed immediately above ground level and adapted to spread the seed from tube 13 into a furrow or similar space therebeneath as the tractor advances. The seed planter is conventional per se and in itself forms no part of the present invention.

Figure 3:
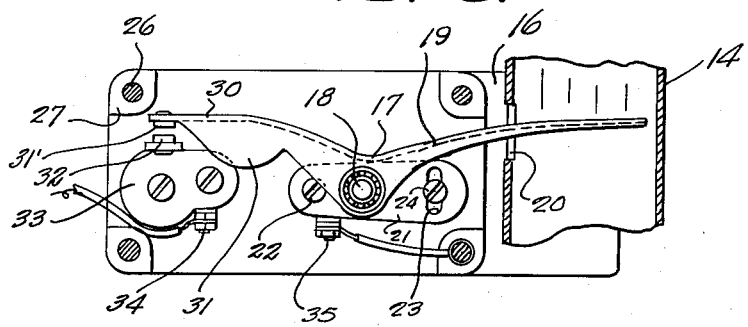
Figure 3 is a vertical cross sectional view taken on the line 3—3 of Figure 2.

Designated at 15 is a vertical plate member of insulating material which is secured to the side wall of the distributing nozzle portion 14 of the planter discharge conduit, as by a supporting bracket 16 rigidly connected to the member 14 and bolted to the plate member 15. Designated at 17 is a lever which is pivoted to the plate member 15, as by a suitable pivot bearing 18, the lever having a first arm portion 19 which extends through a vertical slot 20 provided in the member 14 so that the arm portion 19 is disposed in the path of seeds descending through the discharge member 14, as is clearly shown in Figure 3.

The lever 17 is pivoted, by means of the pivot bearing 18, to an adjustable supporting block 21 which is fastened at one end to the main supporting block 15 by a bolt 22, so that the member 21 is pivotally adjustable around the axis of bolt 22, the member 21 being provided at its other end with an arcuate slot 23 through which extends a clamping bolt 24 for securing the member 21 to the block 15 in a desired position of angular adjustment around the bolt 22.

Figure 2:
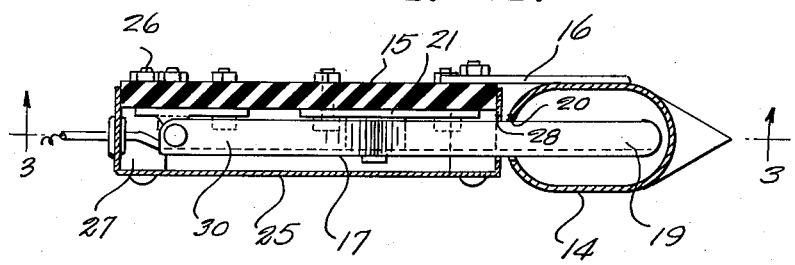
Figure 2 is an enlarged horizontal cross sectional view taken on the line 2—2 of Figure 1.

The member 15 is provided with a protective cover or housing 25 which is secured by bolts 26 to corner lugs 27 formed on the member 15. The end wall of the cover 25 is formed with a vertical slot 28 through which arm portion 19 extends, as shown in Figure 2.

The lever 17 is provided opposite the arm portion 19 with a second arm portion 30 which is formed with a depending weight member 31 of sufficient mass to normally maintain arm portion 19 in an elevated position. The end of the arm portion 30 is provided with a contact 31' which is thus normally biased into engagement with a subjacent contact 32 carried on a bracket member 33 secured to the insulating block 15. The bracket member 33, which is of conductive material, is provided with a terminal 34. The bracket member 21, which is likewise of conductive material and which is electrically connected through the lever 17 to the contact 31', is provided with a similar terminal 35.

Figure 4:
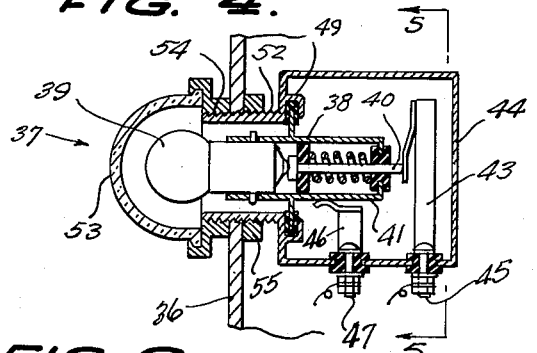
Figure 4 is an enlarged cross sectional detail view taken on the line 4—4 of Figure 1.
Figure 5:
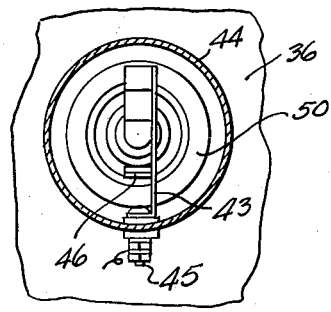
Figure 5 is a cross sectional view taken on the line 5—5 of Figure 4.

Mounted on the dashboard 36 of the tractor is a signal lamp unit 37 comprising a lamp socket 38 in which is mounted a conventional lamp 39, the lamp having a center contact engaging the socket center contact element 40 and having a shell which is connected to the socket shell 41. The socket center contact element 40 engages a conductive contact arm 43 mounted on but insulated from the lamp socket housing 44, the element 43 being provided with the connection terminal 45. The socket housing 44 is provided with a second contact arm 46 which engages the socket shell 41 and which is provided with an externally projecting terminal 47 mounted in but insulated from the side wall of the housing 44. As shown in Fig. 4, the socket shell 38 is supported in the socket housing 44 by a flange 49 provided on the socket shell which is secured in but insulated from an annular channel 50 provided in the forward end wall of the housing 44, the channel 50 extending around the rim of an externally threaded mounting sleeve 52 provided on the forward end wall of housing 44 and being adapted to be secured in an opening provided in the tractor dashboard 36 in the manner illustrated in Figure 4. The bulb 39 extends axially through the sleeve 52 and is covered by a transparent lens 53 which may be of any suitable color. The lens 53 is supported in an annular mounting ring 54 threaded on the sleeve 52, and the sleeve is clamped to the dashboard 36 by a fastening nut 55 threaded on said sleeve opposite the ring 54 and being clampingly engageable with the dashboard 36 to rigidly secure the sleeve 52 to the dashboard in the manner illustrated in Figure 4.

Mounted on the dashboard 36 adjacent the indicating lamp unit 37 is a push button-operated switch assembly 60 comprising a housing 61 provided with a supporting sleeve 62 rigidly carried by an end wall thereof. The sleeve 62 is externally threaded and extends through the dashboard 36, being clamped thereto by a pair of opposing clamping nuts 63, 63. Designated at 64 is a plunger member provided with a shank element 65 which extends slidably through the sleeve 62. The plunger member 64 is provided with a pair of apertured guide lugs 65', 65 on the opposite sides thereof, said guide lugs slidably engaging on respective guide rods 66, 66 which are secured in the housing 61 in parallel relationship to each other and spaced on opposite sides of the axis of the plunger member 64 in parallel relationship to said axis. Coil springs 67 are provided on the rods 66, said springs bearing between the rear end wall 67 of housing 61 and the lugs 65 to bias the plunger member 64 into abutment with the forward end wall 69 of housing 61. This biases the rod element 65 to an externally projecting position, as shown in Figure 6.

Secured to the rear wall 67 of housing 61 in alignment with the plunger 64 is an electromagnet 70. Secured to plunger 64 is a vertical depending bar member 71 of magnetic metal which is in sliding engagement with a first resilient contact member 72 secured to the bottom wall of the housing 61, as shown in Figure 6, and being therefore electrically grounded by housing 61. Secured to the bottom wall of the housing 67 but insulated therefrom is a second contact arm 73 which is engageable by the bar member 71 when the bar member is in a retracted position, namely, is closely adjacent to the core of the magnet 70 so as to be magnetically attracted thereto. In this position, the bar member 71 electrically connects contact member 72 to contact member 73. The contact member 73 is provided with a terminal 74 which is connected to one terminal of the winding of the electromagnet 70. The other terminal of the magnet winding is connected to a terminal 75 mounted in but insulated from the end wall of housing 61.

Figures 6, 7:
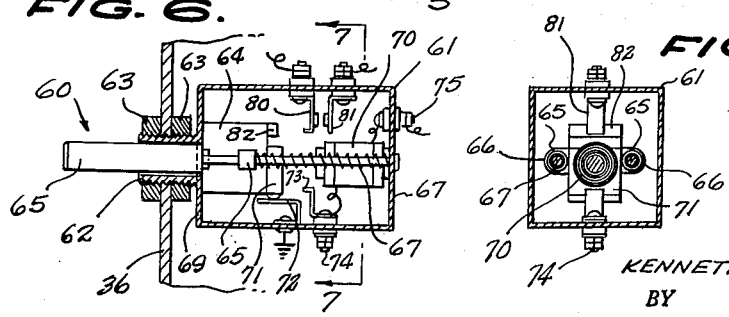
Figure 6 is an enlarged cross sectional detail view taken on the line 6—6 of Figure 1.
Figure 7 is a cross sectional view taken on the line 7—7 of Figure 6.

Secured to but insulated from the top wall of housing 61, as viewed in Figure 6, are a pair of depending contacting elements 80 and 81, the contact element 80 being disposed in the path of movement of a lug 82 provided on the plunger member 64, so that when the plunger 64 is moved inwardly to a position wherein the bar element 71 is attracted to the core of magnet 70, the lug 82 engages the contact member 80 and flexes same into electrical contact with the contact member 81. As will be readily apparent, the contact member 80 continues to engage the contact member 81 as long as plunger member 64 is magnetically attracted to the electromagnet 70, namely, as long as the winding of said electromagnet is maintained energized.

Referring now to Figure 8, it will be seen that one terminal of the vehicle battery 85 is grounded. The other terminal of the battery is connected by a wire 86 through a manually operated master switch 87 to the terminal 75. The contact member 80 is likewise connected to terminal 75. The contact member 81 is connected by a wire 88 to the indicator lamp terminal 45. The terminal 47 of the indicator lamp assembly is connected through a wire 89 and a conventional detachable connector assembly 90 to the terminal 34 associated with the stationary contact member 32. The terminal 35 of the apparatus is grounded. Thus, when seed is descending through the discharge conduit member 14, the lever 17 is rotated in a clockwise direction, as viewed in Figures 3 and 8, opening the contacts 31', 32. When no seed is dropping through the conduit member 14 contact member 31' engages the contact member 32 and thus connects the shell of the lamp 39 to ground.

To place the device in operation, the master switch 87 is closed. The push button element 65 may then be pushed inwardly, causing bar 71 to engage contact element 73, connecting one terminal of the winding of the electromagnet 70 to ground. The electromagnet winding becomes energized, since its remaining terminal is connected to the ungrounded terminal of the battery 85. Plunger member 64 thus remains in bridging relationship to contacts 72 and 73 as long as switch 87 remains closed. In the retracted position of the plunger member 64 the lug 82 causes the contact 81 to engage the contact 80. This completes the energizing circuit for the lamp 39, since the center contact of the lamp is thus connected by wire 88, contacts 81, 80, switch 87 and wire 86 to the ungrounded terminal of battery 85. The lamp 39 remains energized as long as the lever contact 31' engages the stationary contact 32. However, when seed is dropping through the conduit member 14, the lever 17 swings intermittently in a clockwise direction, causing a blinking of the lamp 39 resulting from the intermittent opening of the contacts 31', 32. However, if the lamp stops blinking and remains steadily energized, the operator is thus notified that no more seed is dropping through the conduit member 14. This provides a reliable indication that no more seed is being distributed by the planter.

When it is desired to terminate operation of the indicating apparatus, the operator merely opens the switch 87, thus deenergizing the winding of electromagnet 70, whereby the springs 67 move the plunger member 64 toward the position thereof illustrated in Figure 6, namely, into abutment with the forward wall 69 of housing 61. This opens the contacts 80 and 81 and prevents subsequent energization of the lamp 39 as long as switch 87 remains open.

Therefore, with switch 87 open, it is impossible to energize lamp 39 by pressing the push button element 65 inwardly.

While a specific embodiment of an improved indicating device for a seed planter has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a seed planter, a hopper, a flexible seed discharge tube secured to and depending from the bottom of the hopper, an arm pivoted externally to said tube and having a free end portion projecting into the lower end portion of the seed discharge tube, a biasing weight on the external end portion of the arm, an electrical signal device, switch means operated by said pivoted arm, said biasing weight normally holding the switch means closed, said pivoted arm being intermittently engaged by the seed and intermittently opening said switch means responsive to the passage of seed through the seed discharge tube, and an energizing circuit connected to said signal device and including said switch means, whereby to intermittently energize said signal device when seed is passing through the tube and to steadily energize said signal device when seed no longer passes through the tube.

2. In a seed planter, a hopper, a flexible seed discharge tube secured to and depending from the bottom of the hopper, the lower end portion of said discharge tube being formed with an aperture, an arm pivoted externally to the discharge tube and having a free end portion projecting into the tube through said aperture in the path of seed descending through the tube, a biasing weight on the external end portion of the arm biasing said first-named portion toward an upper position, an electrical signal device, a switch, means closing said switch when said first-named portion is in said upper position, whereby the switch remains closed unless seed is descending through the tube, and an energizing circuit connected to said signal device through said switch, said biasing weight normally holding the switch means closed, said pivoted arm being intermittently engaged by the seed and intermittently opening said switch means, whereby to intermittently energize said signal device when seed is passing through the tube and to steadily energize said signal device when said seed no longer passes through the tube.

3. In a seed planter, a hopper, a flexible seed discharge tube secured to and depending from the bottom of the hopper, the lower end portion of said discharge tube being formed with an aperture, a bracket member externally secured to said tube adjacent said aperture, a lever pivoted to said bracket member and having a free arm portion projecting into the tube through said aperture in the path of seed descending through the tube, a weight carried by the lever opposite said free arm portion and biasing said free arm portion toward an upper position, an electrical signal device, cooperating switch contacts on the end portion of said lever opposite said first-named arm portion and the bracket member closed when said free arm portion is in said upper position and opened responsive to the depression of said free arm portion when seed descending through the tube engages the free arm portion, whereby the contacts remain closed unless seed is discharged through the tube, and an energizing circuit connected to said signal device through said switch contacts, said weight normally holding said contacts closed, said free arm portion being intermittently engaged by the seed when the seed is passing through the tube and intermittently opening said switch contacts, whereby to intermittently energize said signal device when seed is passing through the tube and to steadily energize said signal device when seed no longer passes through said tube.

References Cited in the file of this patent

UNITED STATES PATENTS

| | | |
|---|---|---|
| 836,377 | Filson | Nov. 20, 1906 |
| 2,659,881 | Bogot et al. | Nov. 17, 1953 |
| 2,742,196 | Grether | Apr. 17, 1956 |
| 2,766,441 | Whittle | Oct. 9, 1956 |

FOREIGN PATENTS

| | | |
|---|---|---|
| 426,462 | Germany | Mar. 11, 1926 |